United States Patent
Thompson et al.

(10) Patent No.: US 9,350,967 B2
(45) Date of Patent: May 24, 2016

(54) RECORDING SYSTEM

(71) Applicant: EchoStar UK Holdings Limited, Keighley (GB)

(72) Inventors: Geoffrey Thompson, Keighley (GB); Andrew John Stanford, Baildon (GB); Andrew Hey, Keighley (GB)

(73) Assignee: EchoStar UK Holdings Limited, Steeton (GB)

(*) Notice: Subject to any disclaimer, the term of this patent is extended or adjusted under 35 U.S.C. 154(b) by 0 days.

(21) Appl. No.: 14/275,538

(22) Filed: May 12, 2014

(65) Prior Publication Data
US 2014/0248037 A1 Sep. 4, 2014

Related U.S. Application Data

(63) Continuation of application No. 13/029,322, filed on Feb. 17, 2011, now Pat. No. 8,724,971.

(30) Foreign Application Priority Data

Feb. 19, 2010 (EP) ..................................... 10250302

(51) Int. Cl.
| | |
|---|---|
| H04N 5/445 | (2011.01) |
| H04N 9/79 | (2006.01) |
| H04N 5/782 | (2006.01) |
| H04N 21/235 | (2011.01) |

(Continued)

(52) U.S. Cl.
CPC .................. *H04N 9/79* (2013.01); *H04N 5/782* (2013.01); *H04N 21/235* (2013.01); *H04N 21/435* (2013.01); *H04N 21/4334* (2013.01); *H04N 21/44222* (2013.01); *H04N 21/4532* (2013.01); *H04N 21/4622* (2013.01); *H04N 21/4755* (2013.01); *H04N 21/47214* (2013.01); *H04N 21/84* (2013.01)

(58) Field of Classification Search
CPC ..... H04N 21/4532; H04N 5/782; H04N 5/85; H04N 9/79; H04N 21/4334; H04N 21/44222; H04N 21/435; H04N 21/47214; H04N 21/4755; H04N 21/84; H04N 21/4622
USPC .............................. 386/248, 296, 297; 725/46
See application file for complete search history.

(56) References Cited

U.S. PATENT DOCUMENTS

| | | |
|---|---|---|
| 6,920,281 B1 | 7/2005 | Agnibotri et al. |
| 2002/0174430 A1 | 11/2002 | Ellis et al. |
| 2003/0020744 A1 | 1/2003 | Ellis et al. |
| 2004/0266401 A1 | 12/2004 | Krishnan |
| 2005/0278741 A1 | 12/2005 | Robarts et al. |
| 2006/0143654 A1 | 6/2006 | Mochiduki |
| 2007/0154163 A1 | 7/2007 | Cordray |

(Continued)

FOREIGN PATENT DOCUMENTS

| | | |
|---|---|---|
| GB | 2 441 163 A | 2/2008 |
| WO | 2007/072368 A1 | 6/2007 |

*Primary Examiner* — Thai Tran
*Assistant Examiner* — Mishawn Hunter
(74) *Attorney, Agent, or Firm* — Lowe Graham Jones PLLC

(57) ABSTRACT

The invention relates to an apparatus and method for recording transmitted data items, and particularly television and radio programs. The data items are received at one or more inputs along with ID data identifying the transmitted data items and the program series to which the data item belongs. An input interface receives input indicating whether one or more received transmitted data items have been viewed or recorded by a user and a processor generates values for ranking the series to which each of the received data items belong based upon the received input. Subsequently received transmitted data items are stored in a storage device based on the generated values, the stored data items belonging to a series for which a value has been generated.

20 Claims, 5 Drawing Sheets

(51) Int. Cl.
*H04N 21/433* (2011.01)
*H04N 21/435* (2011.01)
*H04N 21/442* (2011.01)
*H04N 21/45* (2011.01)
*H04N 21/472* (2011.01)
*H04N 21/475* (2011.01)
*H04N 21/84* (2011.01)
*H04N 21/462* (2011.01)

(56) References Cited

U.S. PATENT DOCUMENTS

| | | | |
|---|---|---|---|
| 2007/0266401 | A1 | 11/2007 | Hallberg |
| 2010/0138865 | A1* | 6/2010 | Rai .................. H04N 7/16 725/44 |
| 2010/0220972 | A1 | 9/2010 | Bryan |
| 2012/0084818 | A1 | 4/2012 | Ali et al. |

* cited by examiner

| Program Name | Date | Channel | Start Time | Stop Time | Type | Confidence | | Comment |
|---|---|---|---|---|---|---|---|---|
| | | | | | | Positive | Negative | |
| Dr Who | 7th November 2009 | BBC1 | 5.00pm | 5.50pm | RW | 10 | | *Programme recorded and watched* |
| | 14th November 2009 | | 5.00pm | 5.50pm | RW | 10 | | *Programme recorded and watched* |
| | 21st November 2009 | | 5.00pm | 5.50pm | RW | 10 | | *Programme recorded and watched* |
| | 28th November 2009 | | 5.00pm | 5.50pm | R | 10 | | *Programme recorded within last 5 days* |
| The One Show | 9th November 2009 | BBC1 | 7.00pm | 7.30pm | W | 10 | | *Programme watched from beginning* |
| | 16th November 2009 | | 7.00pm | 7.30pm | W | 10 | | *Programme watched from beginning* |
| | 23rd November 2009 | | 7.00pm | 7.30pm | M | 0 | | *Programme missed* |
| | 30th November 2009 | | 7.00pm | 7.30pm | W | 10 | | *Programme watched from beginning* |
| Coronation Street | 9th November 2009 | ITV1 | 7.30pm | 8.00pm | W | 10 | | *Programme watched from channel change* |
| | 11th November 2009 | | 7.30pm | 8.00pm | W | 10 | | *Programme watched from beginning* |
| | 16th November 2009 | | 7.30pm | 8.00pm | W | 10 | | *Programme watched from channel change* |
| | 18th November 2009 | | 7.30pm | 8.00pm | W | 10 | | *Programme watched from beginning* |
| | 23rd November 2009 | | 7.30pm | 8.00pm | W | 10 | | *Programme watched from beginning* |
| | 25th November 2009 | | 7.30pm | 8.00pm | RW | 10 | | *Programme recorded and watched* |
| | 30th November 2009 | | 7.30pm | 8.00pm | W | 10 | | *Programme watched from channel change* |
| | 2nd December 2009 | | 7.30pm | 8.00pm | W | 10 | | *Programme watched from beginning* |
| This Week | 9th November 2009 | ITV1 | 8.00pm | 8.30pm | W | 9 | | *Subsequent programme* |
| | 16th November 2009 | | 8.00pm | 8.30pm | W | 9 | | *Subsequent programme* |
| | 23rd November 2009 | | 8.00pm | 8.30pm | M | 9 | | *Subsequent programme* |
| | 30th November 2009 | | 8.00pm | 8.30pm | W | 9 | | *Subsequent programme* |
| Emmerdale | 9th November 2009 | ITV1 | 8.30pm | 9.00pm | W | 8 | | *Subsequent programme* |
| | 16th November 2009 | | 8.30pm | 9.00pm | M | 8 | -3 | *STB was switched off 15 mins from end* |
| | 23rd November 2009 | | 8.30pm | 9.00pm | W | 8 | | *Subsequent programme* |
| | 30th November 2009 | | 8.30pm | 9.00pm | W | 8 | | *Subsequent programme* |
| The Bill | 9th November 2009 | ITV1 | | | M | 7 | | *Subsequent programme* |
| | 16th November 2009 | | 9.00pm | 10.00pm | M | 0 | | *Programme was not watched* |
| | 23rd November 2009 | | 9.00pm | 10.00pm | W | 7 | | *Subsequent programme* |
| | 30th November 2009 | | 9.00pm | 10.00pm | W | 7 | -5 | *Subsequent programme TV was switched off, 20 mins from end (detected via HDMI signalling mechanism)* |

Key: M-missed; R- recorded; W-watched

Figure 2

| Event | Points | Modifier |
|---|---|---|
| Programme watched from beginning following channel change or STB switch on, <5, 10, 15 minutes from scheduled start. Programme >30 mins | 10 ,8,6, | |
| Programme watched from beginning following channel change or STB switch on, <5 ,10 minutes from scheduled start. Programme <30 mins | 10,7 | |
| Each subsequent programme if no other interaction takes place, scores one less point than the previous program | $(P^{-1})-1$ | |
| TV volume is adjusted within normal operating range | 10 | |
| Volume is muted < 1minute | 10 | |
| Volume is muted >10 minute | | -5 |
| Info, partial guide or other channel browsing activity eg Now/Next surfing button is pressed. | 10 | |
| Full screen guide, without video is activated for < 2,3,4,5 minutes | 10,8,6,4 | |
| Full screen guide, without video is activated for > 5,10 minutes | | -2,-4 |
| Programme is switched off or from, >5,10,15,20,25 minutes from end . | | -2,-3,-4,-5,-6 |
| Programme is selected for record | 10 | |
| Programme was recorded but has not been watched after 7, 8,9,10,14,21 days | | -1,-2,-3,-4,-5,-6 |
| Interactive sidecar service entered < 2,3,4,5,6,7,8,9,10 minutes | 10,9,8,7,6,5,4,3,2,1 | |
| Interactive sidecar service entered > 10,11,12,13,14 minutes | | -1,-2,-3,-4,-5 |
| Programme was aired but episode not watched | 0 | |
| Same episode watched twice | $P^1+P^2$ (max 12) | |
| Programme watched remotely , eg via SlingLoaded or DLNA media player | 10 | |
| Subsequent programmes watched remotely if no interaction with STB takes palce. | $(P^{-1})-1$ | |
| Programme downloaded to mobile device | 8 | |

Figure 3

Date: 7th November

| Program Name | Channel | Start Time | Stop Time | Event | Time | Points | Total | Comment |
|---|---|---|---|---|---|---|---|---|
| Dick & Dom | CBBC | 2pm | 4pm | Switch on STB (Channel ignored) | 2.25pm | 0 | | Channel change not near start of programme |
| | | | | Volume up (Channel ignored) | 2.30pm | 0 | | |
| | | | | *Programme total* | | | 0 | |
| Rainbow | CBBC | 4.00pm | 5.00pm | Subsequent Programme (Channel ignored) | 4.00pm | 0 | | Subsequent programme to above, so also ignored |
| | | | | *Programme total* | | | 0 | |
| Dr Who | BBC1 | 5.00pm | 5.50pm | Programme recorded | 5.00pm | 10 | | |
| | | | | Programme watched | 5.30pm | 10 | | |
| | | | | *Programme total* | | | 10 | Based on highest score |

Figure 4

Date: 16th November

| Program Name | Channel | Start Time | Stop Time | Event | Time | Points | Total | Comment |
|---|---|---|---|---|---|---|---|---|
| The One Show | BBC1 | 7.00pm | 7.30pm | Switch on STB | 7.02pm | 10 | | Switch on close to start of programme |
| | | | | Volume up | 7.10 | 10 | | |
| | | | | Change channel | 7.29pm | | | |
| | | | | *Programme total* | | | 10 | |
| Coronation Street | ITV1 | 7.30pm | 8.00pm | Watch from channel change | 7.30 | 10 | | |
| | | | | *Programme total* | | | 10 | |
| This Week | ITV1 | 8.00pm | 8.30pm | Subsequent programme | 8.00pm | 9 | | |
| | | | | Full screen guide – 5mins | 8.10 | 4 | | |
| | | | | *Programme total* | | | 9 | |
| Emmerdale | ITV1 | 8.30pm | 9.00pm | Subsequent programme | 8.30pm | 8 | | |
| | | | | Programme switched off | 8.45 | -3 | | Switch off 15 mins from end |
| | | | | *Programme total* | | | 5 | |
| The Bill | ITV1 | 9.00pm | 10.00pm | Programme missed | | 0 | | |
| | | | | *Programme total* | | | 0 | |

Figure 5

| Program Name | Total score | Number of occurences | Average value |
|---|---|---|---|
| Dr Who | 40 | 4 | 10 |
| The One Show | 30 | 4 | 7.5 |
| Coronation Street | 80 | 8 | 10 |
| This Week | 36 | 4 | 9 |
| Emmerdale | 24-3 | 4 | 5.25 |
| The Bill | 21-5 | 4 | 4 |
| | | | |

Figure 6

| Program Name | Average Value | Rank |
|---|---|---|
| Dr Who | 10 | 1 |
| Coronation Street | 10 | 1 |
| This Week | 9 | 2 |
| The One Show | 7.5 | 3 |
| Emmerdale | 5.25 | 4 |
| The Bill | 4 | 5 |
| | | |

Figure 7

RECORDING SYSTEM

PRIORITY CLAIM

This patent application is a Continuation of U.S. Non-Provisional patent application Ser. No. 13/029,322, filed Feb. 17, 2011, published as U.S. Publication No. 2011/0206342, entitled "RECORDING SYSTEM," and issued as U.S. Pat. No. 8,724,971 on May 13, 2014, which claims priority to European Patent Application No. 10250302.6, filed on Feb. 19, 2010, and entitled "Recording System," the contents of which are incorporated herewith in their entireties.

TECHNICAL FIELD

This invention relates to an apparatus and method for automatically recording broadcast items to a storage device.

BACKGROUND

Recording devices for recording transmitted data items such as television or radio programmes are common place devices, existing in many homes. In particular, digital video recorders have grown in popularity considerably in recent years.

Despite the advances made in recording technology users often forget to set their recording devices to record programmes that they usually watch "live", for example when going on holiday, causing them to miss the desired programmes while away from home. Even if the user does remember to set the recording device, such devices have limited memory resources to store programme data and it becomes difficult to calculate how much space they will need.

SUMMARY

The invention is defined in the independent claims to which reference should now be made. Advantageous features are set forth in the dependent claims.

Apparatus and method for recording transmitted data items, and particularly television and radio programmes are disclosed. The data items are received at one or more inputs along with ID data identifying the transmitted data items and the programme series to which the data item belongs. An input interface receives input indicating whether one or more received transmitted data items have been viewed or recorded by a user and a processor generates values for ranking the series to which each of the received data items belong based upon the received input. Subsequently received transmitted data items are stored in a storage device based on the generated values, the stored data items belonging to a series for which a value has been generated.

BRIEF DESCRIPTION OF THE DRAWINGS

Examples of the invention will now be described in more detail, with reference to the drawings in which:

FIG. 2 is an example of a database table that may be generated to store information on watched programmes;

FIG. 3 is an example of how ratings are allocated to programmes;

FIG. 4 is an example of how programmes can be ranked according to the level of confidence that they are actually watched for a particular viewing period;

FIG. 5 is a further example of how programmes can be ranked according to the level of confidence that they are actually watched for a second particular viewing period;

FIG. 6 is an example of average scores calculated for a set of programmes; and FIG. 7 is an example of a prioritised list of programmes.

DETAILED DESCRIPTION

Figure 1:
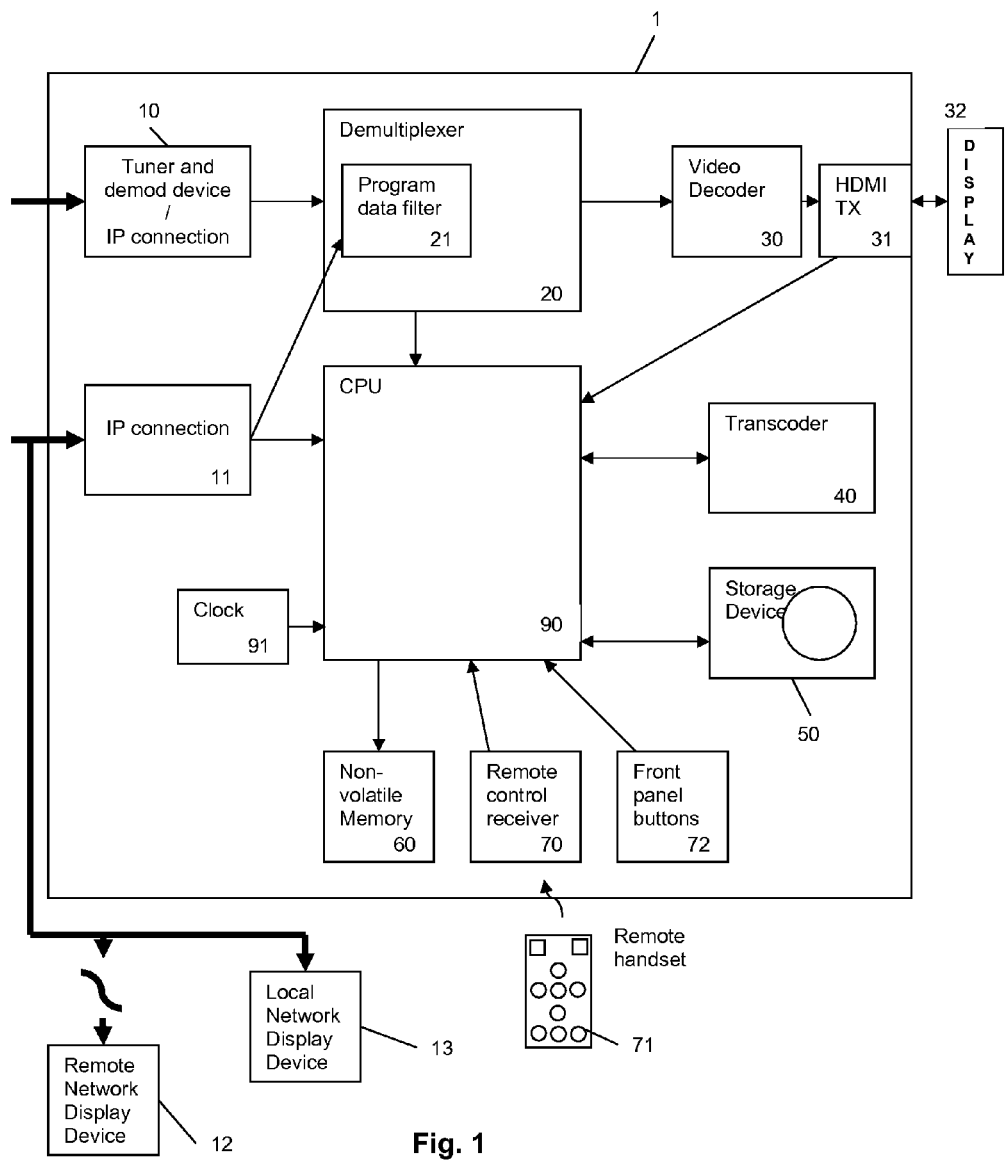
FIG. 1 is a schematic view of a set-top box according to an exemplary embodiment.

Embodiments of the invention may provide an apparatus for recording transmitted data items. Transmitted data items may include transmitted programmes such as radio or television programmes, transmitted via airwaves, internet, wireless network, cable or any other transmission method. The apparatus comprises one or more inputs for receiving transmitted data items and ID data identifying the transmitted items as well as the series of data items to which each transmitted data item belongs, a storage device for storing received transmitted data items and one or more input interfaces for receiving input indicating or implying whether the received transmitted data items have been viewed by a user, for example, by being displayed on a screen, or recorded onto a storage device. The apparatus may also include a processor configured to generate values for ranking each series of received data items based upon the input received at the input interfaces, and a memory containing a database arranged to store the generated values and associate them with the ID data. The generated values are confidence indicators, indicating a ranked level of confidence as to whether a transmitted data item was viewed and/or recorded by a user. The processor is configured to store data items belonging to ranked series in the storage device based on the stored values.

In an exemplary embodiment, the processor generates the values for ranking each series by first generating values for ranking each received data item based upon the input received at the input interfaces, and then combining these values for each of the received data items in a particular series.

The ranking of a transmitted data item, or a series of transmitted data items, may be modified depending upon input received at the input interfaces. The processor can modify the confidence values by increasing or decreasing an initial value by a predetermined amount in response to further input received at the input interfaces. In particular, this may include calculating the elapsed time between two events using a clock signal, one of the events being the receiving of input at an input interface or being triggered thereby, the generated values also depending upon the elapsed time.

In an exemplary embodiment, the input interfaces comprise one or more of a remote control receiver, for receiving input from a remote control, a hardwired component coupled to a physical control on the apparatus and/or a receiving circuit for receiving a signal from an interconnected display device, such as an HDMI connected device. The specific inputs provided to the input interfaces could be one or more of a channel change signal, a volume change signal, a mute signal, a signal to access an electronic programme guide or a signal to record a particular transmitted data item. In particular, the apparatus may be configured to increase the confidence value of a transmitted data item in response to receiving one or more of the following inputs at the input interfaces: an increase in volume signal; a volume mute for less than a predetermined period of time; or an access to an information menu for less than a predetermined period of time. The apparatus may also be configured to decrease the confidence value of a transmitted data item in response to receiving one or more of the following inputs at the input interfaces: a volume mute for longer than a predetermined period of time; an access to an information menu for longer than a predetermined period of time; a switch off signal; or a connected device switch off signal.

In an exemplary embodiment, when the transmitted data items are television or radio programmes, the apparatus may be configured to compare the time at which a channel change occurs and the time at which the first programme starts on the new channel, and to increase the confidence value if the difference is within a predetermined range. As a further option, the apparatus may be configured to compare the time at which a channel change, set-top box switch off or connected device switch off occurs and the time at which the programme ends, and decrease the confidence value if the time difference is within a predetermined range. The apparatus may optionally be configured to decrease the confidence value of programmes following a first programme after a channel change.

Optionally, the apparatus can check free space on the hard drive, estimate the space required for recordings and alert the user if the recordings will exceed the available space. Preferably the apparatus can automatically make best use of available space by prioritising recordings or changing resolution rate of recordings if space is low, for example downgrading High Definition (HD) resolution programs to a lower resolution or to standard resolution. The user may be provided with the option to edit recordings if free space will be exceeded.

Embodiments can be incorporated into recording systems to either automatically, or at a prompt, take care of recording the most likely programmes a user would like to watch while the user is away from home.

Embodiments may be incorporated into a set-top box, radio, computer, media computer or display device, or any similar type of device.

Embodiments may also provide a corresponding method for recording transmitted data items such as radio or television programmes, broadcast via airwaves, internet, wireless network, cable or any other transmission method. Transmitted data items and ID data identifying the transmitted data items and the series to which a transmitted data item belongs are received at one or more inputs, and inputs indicating whether one or more received transmitted data items have been viewed or recorded by a user are received at an input interface. Values are generated for ranking the series to which each of the received data items belong based upon the received input. Subsequently received transmitted data items are then stored in a storage device based on the generated values. The stored data items belonging to a series for which a value has been generated. The generated values may be stored in a database in a memory and associated with the ID data. Further optional method steps are also provided for undertaking the steps described above for the apparatus.

Embodiments may also provide for a computer readable medium having computer code stored therein, wherein the computer code, when executed on an appropriate apparatus, causes the apparatus to carry out the method described herein.

Further embodiments of may also provide an apparatus for recording transmitted items comprising a first input for receiving, from a first source, transmitted data items and ID data identifying the items, a storage device for storing received transmitted data items, a database for storing ID data of transmitted data items to be recorded to the storage device and a processor. The apparatus further includes a second input, which may be combined with the first, for receiving, from a second source, ID data identifying transmitted data items that are stored remotely from the apparatus and comparing means for determining whether ID data in the database corresponds to ID data from the second source. The apparatus is configured such that, if there is a match, the processor prevents storing of the transmitted data item to the storage device and stores a tag identifying the location of the remotely stored transmitted data item. A set-top box or similar device incorporating an apparatus according to this embodiment of the invention can detect which programs are available through a catch-up service, and perhaps record only highlights, then download from the catch-up service if the user attempts to select the content, or alternatively the apparatus could direct the user to the catch up service. A corresponding method is also provided.

It will be understood that data items, such as television or radio programmes, can not only be received over the airwaves, but also by other means such as the internet, cable, wireless networks and the like. For the avoidance of doubt, the term "transmitted programme" will be used throughout the description to refer to a programme transmitted from a broadcaster by any means.

FIG. 1 shows an exemplary embodiment applied to set-top boxes. A set-top box (1) (STB) includes a digital video recording (DVR) function. A receiving device such as a tuner/demodulator (10) is provided to receive broadcast streams, internet delivered streams or the like containing transmitted programmes. Under control of the user via an interface device such as a remote control (71) or front panel buttons (72) the user selects a particular programme/channel to watch or record. This causes the demultiplexer block (20) to select that particular programme stream and either send it to a video decoder (30) and then to a display device (32), such as a television, for watching immediately or send it to a storage device (50) to be watched later. The remote control receiver (70) and front panel buttons (72) are referred to as input interfaces. They receive input indicating whether received transmitted items have been viewed or recorded by a user and provide appropriate signals to the processor. Other input interfaces may be provided.

The demultiplexer block (20) also contains a mechanism for extracting programme data (21) which is carried alongside the video and audio streams. This data is in varying formats but generally carried to agreed standards such as DVB-EIT, TV-anytime etc; and typically contains information about the current program, future programs on the current channel and also other channels that can be received on a particular service. Alternately this information may be supplied from data servers on the internet. This data is commonly called schedule information and, generally, for each broadcast item contains a Programme Name, Start/Stop time and then a detailed description for each episode. There may be additional information such as unique program identifiers, unique series identifiers and also links to future episodes of the programme.

Each time the user selects a transmitted programme to record via the programme schedule, the programme name and identifier appropriate to the programme are logged into an area of memory (60). The system may also log programmes which are decoded by the box when it is in an active state and providing an output that could be being watched. The memory type should ideally be such that its content would be protected even during a power down, so non-volatile memory is preferred such as flash memory, EEPROM, MRAM, or hard disk. A list is thus built up in memory of the user's preferences in terms of programs recorded and watched, or at least output from the set-top box.

Over a period of time the STB will build a database of the user's viewing habits containing programme names, time and date information. However, just because a particular programme stream is selected by the system, and provided as an output for displaying on a display device, this is not necessarily indicative of the user actually watching a transmitted programme. Therefore, the database also includes information indicating the degree of confidence that a programme was actually watched by a user so as to build up a prioritised list in memory of the user's preferences. In order to limit the size of the database, information on programmes may be removed from the database after a period of time, for example 1-3 months. Various compression algorithms may also be applied to limit the size of data.

FIG. 2 shows an example of a database table that may be generated for a particular user or set of users and demonstrates how a prioritised list can be built up in memory. Against each programme in the database the dates on which the transmitted programme was output by the system are recorded. Against each instance that the programme is recorded as being output there will be a confidence level that can be used to determine whether the programme was actually being watched or the apparatus just happened to be switched on.

The system operates by assigning a score to each programme between a first and second value. The closer the score is to the first value, the higher the confidence that the programme was watched. The closer the score is to the second value, the lower the confidence that the programme was watched. Typically the first value will be a higher value than the second value, but it will be appreciated that a system could be designed with the reverse being true. The confidence levels are calculated based on various input data received from one or more input interfaces on the device, such as the remote control receiver (70) shown in FIG. 1, which receives input from a remote control device (71), or from physical controls such as front panel buttons (72) on the set-top-box device. The received inputs, or indicators, are assigned values of confidence; these values may be weighted according to how conclusive the indicator is that a programme was actually watched. Both positive indicators and negative indicators may be combined to reach an overall score.

FIG. 3 shows an example of a database employing such a ranking system, with typical rank values that would be assigned. The system is arranged to respond to various events which are triggered by inputs received at one or more input interfaces of the system. A number of examples of inputs received by the input interfaces of the set-top-box, and the corresponding score assigned to them, are described below in relation to FIG. 3. As indicated by FIG. 3, the inputs received by the input interfaces may not be intended, as their primary function, to indicate that a programme was watched by the user; the system takes advantage of their primary function to provide, as a secondary function, an indication of the likelihood that a programme was actually viewed. This allows the system to automatically generate values for ranking programmes or series of programmes based upon the received input, without requiring direct input indicating preferences for particular programmes from the user. In this way a profile of preferred series can be automatically generated and those series automatically recorded.

FIG. 3 also shows how modifiers or negative indicators can be applied to scores to account for inputs that indicate a programme has not been watched. Negative indicators, also based on inputs received at an input interface, may also be used to reduce the confidence score associated with a programme. Negative indicators may include inputs resulting from a user switching channels or turning off the apparatus during a "live" programme, or stopping the replay of a recording a significant time before the end of a programme. Negative indicators could also be attributed if the box was muted for a significant amount of time or if the user spent a significant amount of time in some associated sidecar service or accessing menus that would detract from viewing, as are common in digital television services. Any number of these indicators/modifiers in any combination may be used to provide an indication of the likelihood that a given programme was actually watched. In the example, programmes are given a score between 0 and 10, but it will be appreciated that different score systems are possible provided each programme can be assigned a value indicative of how likely it is that the programme was actually watched.

Programmes output by the system immediately after a channel change, or switching on the apparatus, are given a high confidence weighting, particularly if the change occurred near to the beginning of the programme. The score can be modified depending upon how near the channel change/switch on occurs to the start of the programme, and the duration of the programme in question. As the time difference from the beginning of the programme increases the rank can be reduced, with an alternate ranking for programmes of short duration. For example, a maximum score of 10 points may be assigned if a programme is switched to within a window of 5 minutes of starting. This can reduce to a score of 8 between a window of 5 to 10 minutes from starting and a score of 6 between 10 and 15 minutes of starting. If the programme is of a shorter duration the score can be reduced for each window, or the length of time for each window can be reduced. Programmes output following switch on can be ignored if switch on occurs more than a predetermined time after the start of the programme. Subsequent events during that programme may then be ignored for the purpose of ranking that programme and subsequent programmes may also be ignored.

In order to detect whether the channel change occurred near to the beginning, programme scheduling information can be compared with a clock signal by the processor (90). The clock signal could be provided from an on-board clock (91), or derived in software; in either case it will be synchronised with the programme transmission. The programme scheduling information could be stored locally on the STB, provided with the transmitted programme or provided separately via a different input.

Subsequent programmes following the first programme after a channel change can be given a decreased level of confidence unless there is some other input received at the apparatus from the user. For example, each subsequent programme may score one less point than the previous programme if no interaction occurs with the system.

Programmes that are specifically recorded on instruction by the user are given a high confidence weighting or level. The user would typically use an input device to select the programme or programme series to be recorded from a schedule database. The processor or CPU (90) would record this event against the relevant programme or set of programmes in the database. In the example of FIG. 3, a programme that has been specifically set to record is given a confidence score of 10.

The system may also monitor whether a recorded programme is subsequently watched. The CPU can determine the length of time between recording a programme and viewing the recording. A programme is recorded as a result of receiving input information at one of the input interfaces indicating it should be recorded; a recorded programme is viewed as a result of one of the input interfaces receiving input indicating the recorded programme should be viewed. If a recorded programme has not been viewed after a predetermined period of time, the overall score can be modified depending on the elapsed time for which the programme has gone unwatched. For example, after 7 days the score may be reduced by 1, with the score being reduced for each subsequent day, or a predetermined pattern of days as illustrated in FIG. 3.

Inputs received at an input interface that could be used to identify whether the user actually watched a particular programme may also include other interactions with input devices such as a remote control or buttons on the set-top box during the period of the programme. Specifically, altering the volume, and particularly increasing it, would indicate that the programme was actually watched, as would accessing the electronic programme guide (EPG) or other service information, particularly to look up information on the programme currently being broadcast. FIG. 3 shows how these inputs can be used to adjust the score of a programme.

If the volume is adjusted within a predetermined range, or muted for more or less than a predetermined period of time, this can be used to score a programme. For example, if volume is adjusted within the normal operating range it is likely that the programme is being watched, and the user simply wishes to adjust the volume to a more comfortable level. Hence, when this occurs the programme in question is given a high confidence score, such as 10. If the volume is muted for a short period of time, such as less than 1 minute, then it is probable that the user was watching the programme but was interrupted, and hence a high score is still assigned. However, if the volume is muted for a long period of time, such as more than 10 minutes, it is likely that the user was not actually viewing the programme and the overall score of that programme can be reduced accordingly.

One common feature of digital services, particularly digital television services, is the provision of information menus such as programme guides and scheduling information that can be displayed during a programme. These menus could be small or partial menus, which do not greatly obscure the programme being displayed, perhaps appearing to the edge of the display screen. Alternatively, the menus may cover a large proportion of the screen, such as a full screen menu in which the programme being viewed is completely obscured or displayed in a smaller inset window. The score assigned to a programme can be modified depending upon whether any information menus are accessed and whether they are accessed for more or less than a predetermined period of time.

Accessing a partial menu indicates that the user is watching the programme being displayed, but may be looking for the next programme to watch. Therefore, programmes for which a partial menu is accessed may be assigned a high confidence value. Accessing a full screen or large information menu for a short period of time probably indicates that the user was still watching the programme. Therefore programmes for which this occurs are given a score dependent upon the period of time for which such menus are accessed. In the example of FIG. 3, a decreasing score is assigned over a period of 5 minutes, and a negative modifier is assigned for periods longer than 5 minutes. A similar rule can be applied to interactive sidecar services, such as information services. If an interactive sidecar is accessed for less than a predetermined time then a particular score can be assigned, the score decreasing as the time spent in the sidecar increases. Past a certain period of time a negative modifier could be used to decrease the score associated with a programme. Examples of such side car services are teletext, MHEG applications, Open TV applications etc, carried on services such as Freeview, BSkyB etc.

If a programme is switched off, either by switching off the entire system or just switching channels, more than a predetermined period from the end then the score can be adjusted accordingly with a negative modifier. The same can apply if a recording of a programme is stopped more than a predetermined amount of time from the end. In this case, the total score of a series can be modified.

The system can be arranged to select particular events from a plurality of events to determine a programme ranking for simplicity. If multiple events occur when a programme is being output then a preferred ranking that can be applied to the programme is the highest of the positive events recorded for the programme plus the lowest of the negative events. Thus, for the example of FIG. 3, a programme watched from the beginning would score the highest rank of +10 and subsequent positive actions such as increasing the volume would be ignored. If, during the programme, a full screen guide without inset video was accessed for 6 minutes (a modifier of −2) and the volume was muted for more than 10 minutes (a modifier of −5), this would attract a total modifier of −5, producing an overall rank of +5.

Once a programme is entered into the monitoring list, the system will then monitor for future versions or episodes of that programme in the schedule. This is achieved either by searching by programme name or by using unique series identifiers dependent on the metadata being broadcast for a particular system. Thus, it is also possible to monitor for episodes of a series that have not been watched. This could be accounted for by assigning an episode of the programme with a zero value, which will then reduce the overall average score for the series. This might not be conclusive evidence as the programme could have been watched by some other means, but it can be useful in providing an overall picture and building a more reliable database.

The system may also include monitoring means for identifying when associated components to the viewing system are switched off, such as if a TV connected using HDMI were switched off, since this is also a very good indicator that the programme is no longer being watched. A receiving circuit may be provided to identify when a signal is received indicating an associated component has been switched off, or to identify when a signal is no longer present indicating that the associated component has been switched off. Preferably the HDMI transmitter (31) includes a signaling mechanism to signal when the display (32) connected is active and when it is turned off.

It will be appreciated that users may often watch content from devices other than their set-top box and locally connected display. Recording devices have been developed that allow content, either in real time or from a storage device, to be transcoded to alternate formats and bit rates and streamed to a remote device (12) such as a laptop, portable computer, mobile device, MP3 or MP4 player, PDAs or similar. Such systems include the SlingLoaded system that combines a digital video recorder (DVR) with this functionality. There could also be devices connected to the local network connection such as a Digital Living Network Alliance (DLNA) media player (13). Whenever content is streamed from the set top box by any means it can be assumed and treated as if a local viewing were to take place. The content may also be downloaded from the set top box to a portable device for viewing on the move. Both these options could be allowed for in the ranking table by allocating points for viewing by this mechanism. To achieve this, the set-top box (1) may include a detection circuit (not shown) to identify when users remotely access their content, using a remote device, either from the storage device or directly from the video decoder. If the system detects that a programme has been downloaded to a remote device, or streamed to a remote device then the confidence score for that programme can be altered accordingly. In the example of FIG. 3, such an event is given a high confidence level.

FIGS. 4 and 5 each show an example of a typical viewing day, itemising the events that occur during a programme, and how these then relate to the rankings that are assigned to individual programmes on those days. Information provided on a daily basis, as illustrated in FIGS. 4 and 5, are compiled into a larger database of the sort shown in FIG. 2. The system then generates from the database a preferred list of programmes. One method to do this is to total the points score for all indicators associated with each programme and then average by the number of times that programme occurred in a specified time period (i.e. the total number of episodes within the time period). Care must be taken however, using the Content Reference ID, which identifies a particular episode of a particular programme, to make sure that repeat showings of an episode, or showings on a time shifted channel are included/excluded as appropriate from these calculations. This can be achieved by only counting a programme having a particular Content Reference ID once. For instance a programme may have two showings, one at peak time and then a repeat perhaps on a different day and sometimes a different channel. For a particular episode it would only be recorded once in the database, even if it were watched twice. Optionally in this particular instance the value for the episode could be the total of the points for both individual viewings, as this could indicate a stronger preference for this program if it was watched multiple times. Thus using a positive scoring system it could be possible for a program to achieve more than the normal maximum limit. It could be desirable to limit this value in some way however to control the effect of viewing multiple times. This is shown in FIG. 3, with P1 and P2 indicating the first instance of the programme and the second instance of the programme respectively, with an overall limit of 12 being applied.

FIG. 6 shows how, from the examples illustrated, an average score can be calculated for each programme, giving a ranking value for each series. These scores will then be sorted by the CPU (90) and a prioritised list for each series such as that shown in FIG. 7 will be arrived at. The higher the value the more likely it is the programmes of a series were actively watched and therefore that it should be recorded. At this stage a threshold value can be invoked. Programmes of a series above a predetermined level would be recorded and programmes below ignored. With the list of FIG. 7 this value might be 7.5. The threshold value could be statically defined or could be varied dynamically dependent upon the amount of recording space available. The exact allocation of points and the associated calculation may be modified to provide a more accurate indication. With a prioritised list in place the CPU (90) will then search the schedule for those programmes, either by programme name or ID, for a predetermined period of time into the future. The period for which the system can check schedule information is limited by the period for which schedule information is provided. Preferably the period of time is one or two weeks, since this is the typical period for which schedule information is available. The processor will then set those programmes which are designated as highly likely to be watched to be recorded.

If the length of time the user will be away from home is greater than the time period provided for programme schedule data then the apparatus can be programmed to assume that particular programmes will occur on a regular basis. The apparatus can be arranged to reserve space accordingly in the storage device so that when programme data does become available in the schedule the programme can be identified and recorded. The apparatus preferably starts with the highest priority programme and searches for that programme on a repeating basis through the schedule. The system can be arranged to make maximum usage of the storage space available, assess the amount of free space available and provide a proposed list of recordings based on programme ranking and free space which the user can accept or modify.

Optionally, the STB may have access to information from a user's calendar. The calendar/diary may be stored in a memory on the STB or could be held on an external memory on another device such as a mobile phone or personal digital assistant (PDA) that the STB can link to and interrogate. Users can then maintain a diary indicating when they will be away from home or unable to access their STB so that the system will automatically know when the user will be unable to view programmes. The system can then automatically analyze the previous viewing habits to build a list of preferred recordings that should take place whilst the user is away.

As well as automatic recording based upon the user's calendar, it is also possible for the user to select this recording mode manually, for example just before leaving the house. The system may also be arranged to advise the user of the best recording strategy to take maximum advantage of free hard disk space. The system can also advise if in order to meet the most preferred list if the user will in fact need to free up more space on his hard disk drive. In order to determine the disk size needed the STB typically utilizes the programmes length in time plus an estimation of the bit rate, for example depending upon whether the signal is encoded in SD or HD. These factors can provide an estimate of the likely storage capacity required for each programme. This is compared with the current free space which can easily be calculated by subtracting the total of all current file sizes as recorded by the recording file system from the known capacity of the recording medium.

If the system determines there is not enough space on the hard drive there are several mechanisms that may be employed to mitigate this and extend the recording capabilities or finding alternate sources for the content. The system may remove unwanted recordings from the hard drive. These could be recordings which have been present for longer than a predetermined time period, corresponding to a considerable time, preferably have not been protectively marked to indicate they should be kept, and have not been watched within a predetermined time period—i.e. recently. There may be earlier recordings which have been recorded speculatively; these may also be identified for deletion if they have been available for some time. The user would of course be warned about such removal first.

As a further optional feature, advantage can be taken of the detection circuit used to identify when users remotely access their content using a remote device. In this case if the user was relying on the automatic mechanisms to schedule their recording and there is insufficient hard drive space, then based on the fact that the user has watched the content remotely, the processor can delete the recording, or update the database such that this content is not recorded in the future. The user would, however, still have the option to connect directly to the DVR function to override this and directly control the recording of the DVR if required.

Optionally, the set-top box may include additional means to increase the number of programmes that can be stored. An embedded transcoding device (40) may be provided to recompress recorded video and audio to lower data rates or resolution when there is insufficient capacity. Recorded programmes will be compressed by the transcoding device from HD quality to standard resolution, for example. The system can be arranged to apply compression only to those programmes with a confidence value in a particular range, or to apply compression in preference order of confidence values from low to high.

The set-top box may also feature an internet connection, which allows the system to interrogate online sites to query if particular content will be available via catch-up services at the end of the period for which the user is away from home. In this case, if there are programmes the system is set to record that are available via the internet, the system can instead suggest that the user accesses the content from the internet. If the desired programme or series of programmes is found to be available online, a marker will be created in the DVR recording list. This may simply be a textual description or it may extend to either a still image or short highlight clips captured instead of the full programme. It will then create a link to the online version of the content when it becomes available, such that the content can be accessed directly on return without needing to search for it.

This technique can also be applied to the normal process of hard disk recordings when either the hard disk becomes full or a recording fails for some reason. In that case the receiver can automatically search for an online version of the content and provide a link directly to the server where such content is located. This aspect of the invention may be applied to any recording device having a connection to the internet, and does not necessarily require the other aspects of the invention to be implemented.

A further optional extension of the techniques discussed above is that even in normal operating mode the DVR will analyze the viewers programme habits and will make use of the unallocated area of hard drive. The system can be arranged to monitor the list of "watched/recorded" programs. If it identifies a programme currently being broadcast that the user would normally watch and it detects that the box is not being watched and the programme has not been tagged to record, then it will automatically record it to the unallocated area, providing there is space on the hard disk. The programmes recorded to this area can be identified by a specific label, be placed in a separate list in the database, or displayed in a different list in the interface. These programmes may be called missed or suggested programmes, for instance, to distinguish them from recordings the user has purposely selected. To limit inconvenience to the user, recordings of this type can be automatically managed, for example being deleted on a first in, first out basis. Programmes of this type can also be automatically deleted if the user wishes to record a programme and space is required, or if newer content is identified to record in this area. It is preferable that the user is able to transfer content from this area to the users own area.

Advantageously, a display interface can be provided to provide a configuration menu such that the user can control the operation of the various modes highlighted above. This menu allows the various modes to be enabled or disabled. It would allow the management of calendar entries. It would allow the automatic or manual selection of this feature. It would allow certain channels to be excluded from the monitoring process. This can be advantageous when there are multiple users of the same receiver or it is left tuned to inconsequential channels for long periods such as children's channels or news.

The embodiments of the invention have been described as using a tuner/demodulator which is typically used to receive transmitted data items, such as programmes broadcast over the air. Multiple tuners/demodulators may be used. Each tuner provides a transport stream which may contain information for several different programmes. Embodiments of the invention can equally utilise transmissions that are not transmitted over the air but are provided, for example, via a cable, or some other form of connection such as a broadband or IP network.

It is possible that transmitted programme information may be provided separately to the transmitted programme data, in which case the demultiplexer block (20) would not need to contain a mechanism for extracting programme data. Instead the programme data may be processed directly by the CPU (90).

Although described as being internal to the set-top box, the memory (60) on which the database of user viewing preferences is constructed may be external to the box, allowing the user to maintain their list on a portable device such as a mobile or PDA. The set-top box would be able to remotely access and interrogate the portable device to populate or update a local database.

The storage device (50) has been referred to throughout as a hard drive, but it will be appreciated that any type of suitable storage device such as flash memory may be used. It is also possible for the memory (60), on which the ranking database is stored, and the storage device (50) to be the same memory device.

It will be appreciated that whilst the invention could be incorporated into separate set-top boxes, it is not limited to traditional set-top box devices as such, since it could be incorporated directly into a display device such as a television, or could be incorporated in a computer system capable of receiving and outputting media.

The invention has been described in relation to transmitted data items, and particularly transmitted television programmes. Transmitted television programmes feature both video and audio components. However, it will be appreciated that the invention could be applied to radio receivers that receive programmes comprising only sound components, and particularly digital radios with in-built storage devices. Furthermore, the invention finds uses in any system that receives data items that belong to a series of data items that the user may want to store to memory.

As mentioned above, it is possible to implement a scheme in which a receiver or set-top box automatically searches for an online version of content and to provide a link directly to the server where the content is located. Therefore, another aspect of the invention may provide an apparatus for recording transmitted data items, the apparatus comprising a first input for receiving, from a first source such as over the air broadcasts, internet, wireless network, cable or any other transmission method, transmitted data items and ID data identifying the items; a storage device, such as a hard disk drive, for storing received data items; a database for storing ID data of data items to be recorded to the storage device and a processor. The apparatus differs from known hard disk drive recorders or the like in that a second input is provided for receiving, from a second source such as over the internet, ID data identifying data items that are stored remotely from the apparatus, such as on a remote server. Comparing means, such as a comparison circuit, or the processor itself, are provided for determining whether ID data in the database corresponds to ID data from the second source. If there is a match the processor stores a tag identifying the location of the remotely stored data item. If memory is short, the apparatus may also prevent the storing of the data item to the storage device. Thus instead of recording locally, maximum use is made of online storage and recording mechanisms. A corresponding method is also provided for recording transmitted items comprising receiving at a first input of an apparatus, from a first source, transmitted data items and ID data identifying the items; receiving at a second input of the apparatus, from a second source, ID data identifying transmitted data items that are stored remotely from the apparatus; comparing the ID data received from the first and second sources and, if there is a match between the ID data from the first and second sources and storing a tag in a memory identifying the location of the remotely stored transmitted data item. Optionally, the further step of preventing the storage of transmitted data items to a storage device can be implemented.

This aspect of the invention can be implemented with or without the other aspects of the invention described above.

The above description is intended to illustrate example embodiments of the invention, but should not be taken to limit in any way the invention as it is defined by the claims.

The invention claimed is:

1. A method of providing access to transmitted data items, the method comprising:
   receiving from a first source, at one or more inputs of an apparatus, a plurality of programmes and associated identifier (ID) data identifying an associated programme and an associated series to which the associated programme belongs;
   receiving, at an input interface, user input indicating that a user is viewing or recording the programmes associated with the series of programmes;
   determining based on the user input whether one or more received programmes have been viewed or recorded by the user;
   generating ranking values for ranking the series to which each of the received programmes belong based upon the received user input and based upon determining whether the programme has been viewed or recorded, wherein each of the ranking values correspond to a confidence value that indicates a likelihood that the user viewed the programme that has been received or recorded; and
   selecting subsequently received programmes based on the generated ranking values, the selected programmes belonging to the associated series for which a ranking value has been generated.

2. A method according to claim 1 further comprising:
   storing the generated ranking values in a database in a memory and associating them with the ID data; and
   storing the selected programmes in a storage device.

3. A method according to claim 1, wherein generating the ranking values comprises:
   generating ranking values configured to rank each of the received programmes based upon the received user input; and
   combining the generated ranking values for each of the programmes associated with a particular series to produce a ranking value for ranking each series.

4. A method according to claim 1, wherein the ranking values generated by a processor to rank the transmitted programmes are confidence values indicative of how likely it is that the user viewed a particular transmitted programme, the method further comprising:
   modifying the confidence values by increasing or decreasing an initial confidence value by a predetermined amount in response to further input received at the input interfaces.

5. A method according to claim 1, wherein the generated ranking values also depend upon the elapsed time between two events, wherein at least one of the events corresponding to at least one of receiving of input at the input interface or being triggered thereby.

6. A method according to claim 1, wherein the user input received at the input interface is from at least one of a remote control, a control on the recording device, and a signal from an interconnected display device.

7. A method according to claim 1, wherein the programme is a television or radio programme, and wherein one of a plurality of events is a user input that is a channel change to a new programme channel, and the other event being a start time of a first programme on the new channel, the method further comprising:
   comparing a time at which the channel change occurs and the time at which the first programme starts on the new programme channel; and
   increasing a confidence value if the difference is within a predetermined range.

8. The method according to claim 1, further comprising:
   receiving, from a second source, ID data identifying transmitted programmes that are stored remotely from the apparatus;
   comparing, for a selected programme, ID data received from the first and second sources; and
   if there is a match between the ID data from the first and second sources, storing a tag in a memory identifying the location of the remotely stored selected programme.

9. The method according to claim 8, further comprising:
   preventing the storage of the selected programme to the storage device if there is a match between the ID data from the first and second sources for the selected programme.

10. An apparatus for providing access to transmitted programmes, the apparatus comprising:
    one or more inputs for receiving, from a first source, programmes and associated identifier (ID) data identifying the programme and a series of programmes to which each programme belongs;
    one or more input interfaces for receiving input from a user to view or store the received programmes associated with the series;
    a processor configured to:
      determine whether the one or more received programmes have been viewed or recorded by the user; and
      generate ranking values for ranking each series of received programmes based upon the input received at the input interfaces and based upon whether the programme has been viewed or recorded, wherein each of the ranking values correspond to a confidence value that indicates a likelihood that the user viewed the programme that has been received or recorded; and
    a memory having a database arranged to store the generated ranking values and to associate the ranking values with the ID data;
    the processor being configured to select programmes belonging to ranked series based on the stored ranking values.

11. The apparatus according to claim 10 wherein the processor is configured to:
    generate the ranking values for ranking each received programme based upon the user input received at the input interfaces; and
    generate values for ranking each series by combining the ranking values for each of the received programmes in a particular series.

12. The apparatus according to claim 11 wherein the ranking values generated by the processor to rank the programmes are confidence values indicative of how likely it is that the user viewed a particular programme, the processor being configured to modify the confidence values by increasing or decreasing an initial value by a predetermined amount in response to further user input received at the input interfaces.

13. The apparatus according to claim 12 further comprising an input for a clock signal, wherein the processor is configured to calculate an elapsed time between two events using the clock signal, one of the events being the receiving of the user input at the input interface or being triggered thereby, the generated values also depending upon the elapsed time.

14. The apparatus according to claim 13, wherein one of the events is a channel change to a new channel, and the other event is a start time of a first programme on the new channel, the processor being configured to compare the time at which the channel change occurs and the start time at which the first programme starts on the new channel, and wherein the processor is configured to increase the confidence value if the difference is within a predetermined range.

15. The apparatus according to claim 13, wherein one of the events is one of a channel change to a new channel, a set-top box switch off or a connected device switch off, and the other event is the end time of a programme, the processor being configured to compare a time at which the channel change, set-top box switch off or connected device switch off occurs and a time at which the programme ends, and wherein the processor is configured to decrease the confidence value if the difference is within a predetermined range.

16. The apparatus according to claim 10, wherein the apparatus comprises at least one selected from a group consisting of a set-top box, a radio, a computer and a media computer, and further comprising:
    an input and output for sending signals to and receiving signals from a remote device, the remote device being capable of streaming or downloading content from the apparatus, wherein the processor is configured to detect when content is output to the remote device and to alter the stored ranking values.

17. The apparatus according to claim 10, and further comprising:
    an input and output for sending and receiving signals to/from a user's calendar, the processor being configured to generate ranking values and store received programmes for periods of time for which the calendar contains a predetermined entry.

18. The apparatus according to claim 10, wherein the processor is further configured to:
    receive, from a second source, ID data identifying programmes that are stored remotely from the apparatus;
    compare ID data from the first and second sources to determine whether a selected programme is remotely stored; and
    store a tag in the memory identifying the location of the selected programme when the comparison indicates that it is remotely stored.

19. The apparatus according to claim 10, further comprising:
    a storage device for storing received programmes, the processor being configured to:
        store the selected programmes in the storage device; and
        prevent the storage of a selected programme to the storage device if there is a match between the ID data from the first and second sources for the selected programme.

20. A non-transitory computer-readable medium that includes code that is configured, when executed by a processor, to cause the processor to provide access to transmitted programmes by performing a method comprising:
    receiving from a first source, at an apparatus, a plurality of programmes and associated identifier (ID) data identifying an associated programme and an associated series to which the associated programme belongs;
    receiving, at an input interface, user input indicating that a user is viewing or recording the programmes associated with the series of programmes;
    determining based on the user input whether one or more received programmes have been viewed or recorded by the user;
    generating ranking values for ranking the series to which each of the received programmes belong based upon the received user input and based upon determining whether the programme has been viewed or recorded, wherein each of the ranking values correspond to a confidence value that indicates a likelihood that the user viewed the programme that has been received or recorded; and
    selecting subsequently received programmes based on the generated ranking values, the selected programmes belonging to the associated series for which a ranking value has been generated.

* * * * *